United States Patent Office 3,488,360
Patented Jan. 6, 1970

3,488,360
1,2,5-THIADIAZOLES AND METHODS FOR PREPARING SAME
Leonard M. Weinstock, Rocky Hill, and Roger J. Tull, Metuchen, N.J., assignors to Merck & Co., Inc., Rahway, N.J., a corporation of New Jersey
No Drawing. Filed Aug. 1, 1966, Ser. No. 569,013
Int. Cl. C07d 91/54; A61k 27/00
U.S. Cl. 260—302       5 Claims

ABSTRACT OF THE DISCLOSURE

Novel 1,2,5-thiadiazoles having at the 3-position an alkenyloxy, alkynyloxy or alkoxy group and at the 4-position a cyano, amino or a carbamoyl group are prepared by treating an alkali or an alkaline earth metal salt of 3-hydroxy-4-cyano-1,2,5-thiadiazole with an alkenylating, alkynylating or alkylating agent; hydrolyzing the resulting product under basic conditions to convert the cyano to the carbamoyl group; and converting the carbamoyl group to the amino group by treatment with an aqueous alkaline hypohalite in the presence of a strong base. The 1,2,5-thiadiazoles so produced are useful intermediates in the preparation of 3-loweralkoxy, 3-loweralkenyloxy and 3 - loweralkynyloxy - 4-sulfanilamido-1,2,5-thiadiazoles, which compounds have anticoccidial and antibacterial activity.

---

This invention relates to new chemical compounds useful as intermediates in the synthesis of sulfathiadiazole compounds having anticoccidial activity. More particularly, it relates to novel 1,2,5-thiadiazoles and to methods of making such thiadiazoles. Still more specifically, it is concerned with 1,2,5-thiadiazoles substituted at the 3-position with an alkenyloxy, an alkynyloxy or an alkoxy radical and at the 4-position with a cyano, amino or a carbamoyl radical. It is also concerned with new processes for the synthesis of these new substances. In addition, it relates to a new method for preparing 3-lower alkoxy, 3-lower alkynyloxy, and 3-lower alkenyloxy-4-sulfanilamido-1,2,5-thiadiazoles, which compounds have anticoccidial and antibacterial activity.

As applied to 3-alkenyloxy-4-sulfanilamido-1,2,5-thiadiazoles, the invention comprises broadly the conversion by alkenylation of an alkali or an alkaline earth metal salt of 3-hydroxy-4-cyano-1,2,5-thiadiazole to 3-alkenyloxy-4-cyano-1,2,5-thiadiazole, the hydrolysis of this latter product to 3-alkenyloxy-4-carbamoyl-1,2,5-thiadiazole, conversion of the 3-alkenyloxy-4-carbamoyl-1,2,5-thiadiazole to 3-alkenyloxy-4-amino-1,2,5-thiadiazole, and the reaction of the amino compound with N-acylsulfanilyl chloride to form 3-alkenyloxy-4-(N⁴-acylsulfanilamido)1,2,5-thiadiazole. The latter compound is subsequently deacylated to form 3-alkenyloxy-4-sulfanilamido-1,2,5-thiadiazole. When an alkylating or alkynylating agent is used in the first step of this process, in place of an alkenylating agent, and the remaining steps carried out in the same way, the corresponding 3-alkoxy or 3-alkynyloxy-4-sulfanilamido-1,2,5-thiadiazole is formed.

The overall process of the synthesis may be represented structurally as:

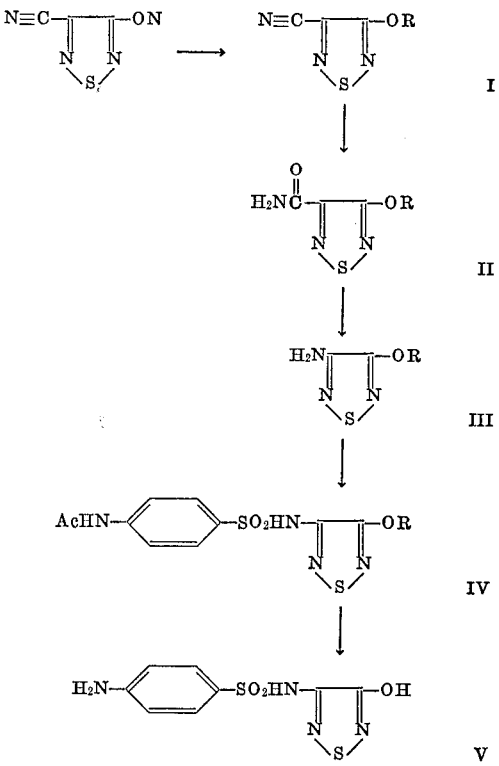

wherein R represents lower alkyl such as ethyl, propyl or butyl, lower alkenyl such as allyl, or methallyl, or lower alkynyl such as 2-butynyl, 3-butynyl, 2-propynyl; M represents an alkali or an alkaline earth metal, examples being sodium, potassium or calcium and Ac represents acyl, preferably a lower alkanoyl radical such as acetyl, propionyl or buturyl, or an aroyl such as benzoyl.

In the first step of the process of this invention Compound I is prepared by treating an alkali or an alkaline earth metal salt of 3-hydroxy-4-cyano-1,2,5-thiadiazole with an alkenylating, alkynylating, or alkylating agent, such as allyl bromide, 2-butenyl chloride, 3-butynyl chloride, methallyl chloride, ethyl bromide, propyl bromide, or diethyl sulfate, 3-propynyl chloride, 3-butynylchloride.

A preferred method of preparing Formula I is to heat a mixture of an alkyl, an alkynyl, or an alkenyl halide and an alkali or an alkaline metal salt of 3-hydroxy-4-cyano-1,2,5-thiadiazole with a weak base, suitably an alkali metal carbonate such as sodium or potassium carbonate, and an alkali metal iodide in a suitable solvent medium. Although the solvent medium is not critical, examples of solvents which are satisfactory in this process are acetone, dimethyl formamide, and acetonitrile.

The use of the alkali metal carbonate or the alkali metal iodide is not necessary, the former's presence acting to insure that all of the hydroxy compound is present in an anionic form, whereas the iodide increases the rate of alkylation, alkynylation or alkenylation where the aforementioned is accomplished by using an alkyl, or alkynyl, or an alkenyl chloride or bromide.

In this manner sodium and potassium salts of 3-hydroxy-4-cyano-1,2,5-thiadiazole may be converted to the compounds of Formula I, wherein R may be methyl, ethyl, n-propyl, isopropyl, allyl, methallyl, or 2-butynyl.

As the second step of the process of this invention compounds of Formula II above are prepared by treating compounds of Formula I in an aqueous medium or an aqueous alcohol medium with a catalytic amount of base, such as sodium or potassium carbonate or sodium or potassium hydroxide. The resultant product crystallizes upon cooling to form compounds of Formula II such as 3-allyloxy-4-carbamoyl-1,2,5-thiadiazole or 3-propoxy-4-carbamoyl - 1,2,5 - thiadiazole, or 3 - butynyloxy - 4 - carbamoyl-1,2,5-thiadiazole.

Variations of this hydrolysis may be carried out, and although an aqueous alkaline hydrolysis produces satisfactory results, better yields are obtained when an alkaline aqueous alcohol hydrolysis is used. Although the use of 50% tertiary butyl alcohol is preferred as the hydrolysis medium, any lower alkanol may be used, such as ethyl, methyl or isobutyl alcohols, or isopropyl alcohol.

Additionally, the hydrolysis may be performed using as the base a basic anion exchange resin, suitably a polystyrene quaternary ammonium hydroxide such as Amberlite IRA–400 (manufactured by Rohm and Haas). The hydrolysis will proceed at temperatures ranging from room temperature to 100° C., although a preferred temperature is from about 65°–95° C. In this manner compounds of Formula II, where R is as defined above may be prepared.

According to the next step of the process of this invention compounds of Formula III shown above are obtained by treating a compound of Formula II with an aqueous alkaline hypohalite such as sodium or potassium hypochlorite or hypobromite. In this step a strong base is required, such as sodium or potassium hydroxide, and although 2 moles of the base are needed for every mole of amide for maximum yields, amounts in excess of this can be used if desired.

In this manner 3-methyl-(propyl or butyl)-4-amino-1,2,5 - thiadiazole, 3 - allyl-(or methallyl)-4-amino-1,2,5-thiadiazole, and 3-(2-butynyl, 3-butynyl, or 3-propynyl)-4-amino-1,2,5-thiadiazole may be obtained.

A preferred embodiment of the process of this invention is the conversion of the compounds of Formula I to the compounds of Formula III without isolating the compound of Formula II. This procedure involves the hydrolysis of the cyano substituent of the compound illustrated by Formula I to the amide by treatment with a base such as sodium hydroxide or sodium carbonate in an aqueous alcohol mixture, suitably a lower alkanol such as methyl, n-propyl, isopropyl or tertiary butyl alcohol. The amide substituent is then directly converted to the amine to form a compound illustrated by Formula III by treatment with additional base and an alkali hypohalite such as sodium or potassium hypochlorite or hypobromite. The resulting product of Formula III is isolated by extraction with a suitable water-immiscible solvent such as ether, benzene, chloroform or ethyl acetate. The temperature limitations in this procedure are not critical. The hydrolysis can be carried out at room temperature or at temperatures as high as 100° C., and the rearrangement of the amide to the amine can be carried out initially at from 0–25° C., and is terminated at elevated temperatures, preferably at from 60–90° C.

Additionally, the nitrile of Formula I can be converted directly to the amine of Formula III by dissolving a compound of Formula I in an aqueous solution containing a strong base and an alkali hypochlorite or hypobromite. Temperature limitations are not critical, the reaction being initiated at 0–25° C., and terminated at an elevated temperature, preferably at about 60–90° C.

In this manner 3-allyloxy-4-amino-1,2,5-thiadiazole, 3-methallyloxy - 4 - amino-1,2,5-thiadiazole, 3-n-propoxy-4-amino-1,2,5-thiadiazole, 3 - ethoxy-4-amino-1,2,5-thiadiazole, 3-(2-butynyloxy)-4-amino-1,2,5-thiadiazole, and 3-(2-propynyloxy)-4-amino-1,2,5-thiadiazole may be prepared.

As the fourth step of the process of this invention compounds of Formula IV are prepared by reacting a compound of Formula III with N-acylsulfanilyl chloride in the presence of an acid binding agent such as pyridine at a temperature of from about 0–50° C. Although the N-acylsulfanilyl chloride may contain any acyl radical, such as propionyl, butyryl or aroyl such as benzoyl, N-acetyl is preferred.

In a similar manner 3-allyloxy-4-($N^4$-acetylsulfanilamido)-1,2,5-thiadiazole, 3-propoxy-4-($N^4$-acetylsulfanilamido)-1,2,5-thiadiazole, 3-methallyloxy-4-($N^4$-acetylsulfanilamido)-1,2,5-thiadiazole, and 3-(2-butynyloxy)-4-($N^4$-acetylsulfanilamido)-1,2,5-thiadiazole may be prepared.

A compound of Formula V is produced as a fifth step of the process of this invention by deacylating the compound of Formula IV by suitable means such as acid or basic hydrolysis, using a strong base such as sodium or potassium hydroxide, or a strong mineral acid such as 6 N hydrochloric acid.

A preferred method of preparing a compound of Formula V is to combine steps 4 and 5 without isolating Compound IV by reacting N-acylsulfanilyl chloride with a product of Formula III as described in step 4, and directly proceeding with step 5 as described above. All the conditions of the above two steps apply to this reaction.

Although not intended as a part of the present invention, the starting material may be prepared by dissolving sodium, potassium or calcium cyanide in a suitable solvent, such as ethyl acetate, propyl acetate, and acetonitrile, and subsequently treating this mixture with sulfur dioxide. The resulting product is a corresponding salt of 3-hydroxy-4-cyano-1,2,5-thiadiazole.

The following examples are given for the purpose of illustration and not by way of limitation.

EXAMPLE 1

3-allyloxy-4-cyano-1,2,5-thiadiazole

A mixture of 1 g. (6.05 mmole) of the potassium salt of 3-hydroxy-4-cyano-1,2,5-thiadiazole, 1.0 g. (8.27 mmole) of allyl bromide, 16 ml. of acetonitrile, 647 mg. (6.1 mmole) of sodium carbonate and 72 mg. of sodium iodide are heated at 55° for 4 hours. The mixture is then cooled and poured into 20 ml. of water. The two-phase mixture is extracted with 3 × 10 ml. of petroleum benzene. The combined organic extracts are dried with magnesium sulfate and stripped in vacuo on a water bath to give 960 mg. of 3-allyloxy-4-cyano-1,2,5-thiadiazole as an oil.

When the above procedure is repeated using propyl bromide, 3-n-propoxy-4-cyano-1,2,5-thiadiazole is formed.

A.—A mixture of 0.588 g. (3.56 mmole) of the sodium salt of 3-hydroxy-4-cyano-1,2,5-triadiazole, 1.0 g. (8.27 mmole) of allyl bromide, 16 ml. of acetonitrile, 647 mg. (6.1 mmole) of sodium carbonate and 72 mg. of sodium iodide are heated at 55° for 4 hours. The mixture is then cooled and poured into 20 ml. of water. The two-phase mixture is extracted with 3 × 10 ml. of petroleum benzene. The combined organic extracts are dried with magnesium sulfate and stripped in vacuo on a water bath to give 960 mg. 3-allyloxy-4-cyano-1,2,5-thiadiazole as an oil.

EXAMPLE 2

3-(2-butynyloxy)-4-cyano-1,2,5-thiadiazole

A mixture of 0.11 mole of the potassium salt of 3-hydroxy-4-cyano-1,2,5-thiadiazole, 0.15 mole of 2-butynyl chloride, 75 ml. of dimethyl formamide and 1.3 g. of sodium iodide are heated at 55–60° C. for 4 hours. The mixture is then cooled and poured into 200 ml. of water. The two-phase mixture is extracted with 3 × 100 ml. of pentane. The combined organic extracts are then dried with magnesium sulfate and the solvent evaporated, using a water bath at 50–60° C. to give an oily residue of 3-(2-butynyloxy)-4-cyano-1,2,5-thiadiazole.

EXAMPLE 3

3-allyloxy-4-carbamoyl-1,2,5-thiadiazole

A solution of 13.24 g. (29.5 mmole) of 3-allyloxy-4-cyano-1,2,5-thiadiazole in 65 ml. of absolute ethanol and 65 ml. of water is heated to reflux and 4 ml. of 2.5 N aqueous sodium hydroxide solution is added. After 12 minutes at reflux, the solution is cooled to 5° C. and aged with stirring for one hour. The precipitate is filtered and washed with ice water and dried in vacuo at 40° C. to give 11.23 g. of 3-allyloxy-4-carbamoyl-1,2,5-thiadiazole, M.P. 107–109° C.

When the above procedure is repeated using 3-n-propoxy-4-cyano-1,2,5-thiadiazole, 3-methallyloxy-4-cyano-1,2,5-thiadiazole, the corresponding loweralkoxy or loweralkenyloxy-4-carbamoyl-1,2,5-thiadiazole is obtained.

The following examples illustrate variations in the hydrolysis procedure of Example 3.

A.—When the procedure of Example 3 is repeated using 6 g. (.036 mole) of 3-allyloxy-4-cyano-1,2,5-thiadiazole, 6.05 g. (0.108 mole) of potassium hydroxide and 105 ml. of absolute ethanol, 3-allyloxy-4-carbamoyl-1,2,5-thiadiazole is obtained, M.P. 100–103° C.

B.—When the procedure of Example 3 is repeated using 1 g. (.006 mole) of 3-propoxy-1,2,5-thiadiazole, 10 ml. of water and 0.4 ml. of 2.5 N NaOH, 3-n-propoxy-4-carbamoyl-1,2,5-thiadiazole is formed.

C. When the procedure of Examples 3 is repeated using 1 g. (.006 mole) of 3-allyloxy-4-cyano-1,2,5-thiadiazole and 0.1 g. of sodium carbonate, 10 ml. of water, and refluxed for 25 minutes, 3-allyloxy-4-carbamoyl-1,2,5-thiadiazole is formed.

D. Two g. of 3-allyloxy-4-cyano-1,2,5-thiadiazole is combined with 2 g. of Amberlite IRA–400 (a polystyrene quaternary ammonium hydroxide, manufactured by Rohm and Haas), and 25 ml. of water and refluxed for one hour. The hot mixture is filtered and the resin is washed with 2× 25 ml. of hot water. The filtrate is cooled and extracted with 4× 100 ml. of ether. The combined ether extracts are dried with magnesium sulfate and the solvent evaporated in vacuo to yield a residue of 3-allyloxy-4-carbamoyl-1,2,5-thiadiazole, M.P. 102–106° C.

E. Five g. (0.03 mole) of 3-allyloxy-4-cyano-1,2,5-thiadiazole, 25 ml. of tertiary butyl alcohol, and 25 ml. of water are heated to reflux. 1.56 ml. (3.9 mmole) of 2.5 N sodium hydroxide is then added and the mixture is refluxed for an additional 12 minutes. The mixture is then cooled and filtered, and the filtrate is washed with ice water. The filtrate is extracted with 3× 25 ml. of chloroform. The combined chloroform extracts are dried with magnesium sulfate, and the solvent evaporated to yield a residue of 3-allyl-4-carbamoyl-1,2,5-thiadiazole, M.P. 106–109° C.

EXAMPLE 4

3-(2-butynyloxy)-4-carbamoyl-1,2,5-thiadiazole 0.006 mole of 3-(2-butynyloxy)-4-cyano-1,2,5-thiadiazole is added to 6.75 ml. of a solution containing 10 g. (.012 mole) of potassium hydroxide in 100 ml. of isopropyl alcohol which has been previously chilled to about 0° C. The mixture is allowed to remain at 0° C. for about 15 minutes, during which time a precipitate forms. The mixture is then warmed to room temperature and stirred for 1 hour. The mixture is then filtered and the precipitates washed with isopropyl alcohol. The solvent is evaporated to give 3-(2-butynyloxy)-4-carbamoyl-1,2,5-thiadiazole.

EXAMPLE 5

3-allyloxy-4-amino-1,2,5-thiadiazole

To a solution of 36 ml. of 0.75 molar sodium hypochlorite (27 mmoles) and 2.84 ml. of 50% sodium hydroxide there is added 5.0 g. (27 mmoles) of 3-allyloxy-4-carbamoyl-1,2,5-thiadiazole. The mixture is warmed to 70° C. and held for one hour with stirring. The solid is quickly dissolved on warming, and an oily product forms in about ten minutes. At the end of the heating period 20 ml. of ethyl ether is added and the layers are separated. The aqueous phase is washed with 20 ml. of ethyl ether, and the combined ether extracts are dried with magnesium sulfate, and the solvent is removed in vacuo in a water bath to give an oil, consisting of 3-allyloxy-4-amino-1,2,5-thiadiazole.

EXAMPLE 6

3-allyloxy-4-amino-1,2,5-thiadiazole

A.—To a solution of 13.5 ml. of 1.51 N potassium hydroxide in isopropyl alcohol chilled to 0° C. there is added 2 g. (.012 mole) of 3-allyloxy-4-cyano-1,2,5-thiadiazole. The temperature is maintained at 0° C. for 15 minutes before allowing the mixture to warm to room temperature. It is stirred for one hour at room temperature, then 4.8 ml. of 2.5 N sodium hydroxide (0.12 mole) and 8.05 ml. of 1.49 molar sodium hypochlorite (0.12 mole) is added, and the mixture is heated at 70° C. for one hour. It is then cooled and extracted with 3× 50 ml. of ether. The combined ether extracts are washed with 25 ml. of water, and then dried with magnesium sulfate. The ether is removed by concentration in vacuo at room temperature to give 3-allyl-4-amino-1,2,5-thiadiazole as an oily residue.

B.—5 grams of 3-allyloxy-4-cyano-1,2,5-thiadiazole is added to a mixture of 25 ml. of water, 25 ml. of absolute ethanol and 2 ml. of 2.5 N sodium hydroxide at room temperature. The mixture is refluxed for 12 minutes, then cooled to room temperature and 3.16 ml. of sodium hydroxide and 40 ml. of 75 molar sodium hypochlorite is added. The mixture is then heated at 70° C. for one hour. It is then cooled and extracted with 3× 50 ml. of ether. The combined ether extracts are washed with 25 ml. of water and then dried with magnesium sulfate. The ether is removed by concentration in vacuo at room temperature to give 3-allyl-4-amino-1,2,5-thiadiazole as an oily residue.

C.—A mixture of 5 g. of 3-allyloxy-4-cyano-1,2,5-thiadiazole (0.03 mole), 25 ml. of tertiary butanol and 25 ml. of water is heated to reflux. 1.56 ml. 2.5 N sodium hydroxide (3.9 mmole) is added and the mixture refluxed for 12 minutes. The mixture is acidified by the addition of 0.27 ml. (4.7 mmole) glacial acetic acid, and cooled to room temperature. A mixture of 3.16 ml. of 19 N sodium hydroxide (0.06 mole) and 23.6 ml. of 1.27 N sodium hypochlorite is added dropwise and warmed to 70° C., and the mixture is maintained at 70° C. for one hour. At the end of this time 6 ml. of 12 N hydrochloric acid is added, and the tertiary butanol is azeotropically distilled until the vapor temperature reaches about 90° C. 1.5 ml. of 19 N sodium hydroxide is added, and the resultant mixture is extracted with 3× 25 ml. of benzene. The benzene extracts are washed with 10 ml. of water, dried with magnesium sulfate, and the solvent is evaporated in vacuo to give 3-allyloxy-4-amino-1,2,5-thiadiazole.

D.—5 grams (0.03 mole) of 3-allyloxy-4-cyano-1,2,5-thiadiazole, .05 g. of sodium carbonate and 50 ml. of water is refluxed at about 100° C. for 40 minutes and then cooled to about 25° C. A mixture of 20.2 ml. of 1.49 molar NaOCl (0.03 mole) and 3.16 ml. of 19 N sodium hydroxide (.06 mole) is added to the thiadiazole mixture and heated to 70° C. for one hour. The mixture is then cooled and extracted with 25 ml. of water, dried with magnesium sulfate, and the solvent evaporated to give 3-allyloxy-4 - amino - 1,2,5 - thiadiazole, M.P. 137–139° C.

E.—A mixture of 20 ml. of water, 3.16 ml. of 19 N sodium hydroxide (60 mmole) and 23 ml. of 1.44 molar sodium hypochlorite (33 mmoles) is cooled to about 0° C. To this mixture is added 5 g. of 3-allyloxy-4-cyano-1,2,5-thiadiazole. The mixture is then aged with stirring for 18½ hours at 0° C. It is then warmed to room temperature and stirred an additional 4½ hours. The clear mixture is heated at 70° C. for 1 hour and then cooled to room temperature; and oily solid forms. The solid is then heated to 70° C. for ½ hour, cooled, and extracted with 3× 25 ml. of water and dried with magnesium sulfate. The solvent is evaporated in vacuo to yield 3-allyloxy-4-amino-1,2,5-thiadiazole.

EXAMPLE 7

3-(2-butynyloxy)-4-amino-1,2,5-thiadiazole

To a solution of 36 ml. of 0.75 molar sodium hypochlorite (27 mmole) and 2.84 ml. of 50% sodium hydroxide there is added 27 mmoles of 3-(2-butynyloxy)-4-carbamoyl-1,2,5-thiadiazole. The mixture is warmed to 70° C. and held for one hour with stirring. The solid is quickly dissolved on warming, and an oily product forms in about 10 minutes. At the end of the heating period 20 ml. of ethyl ether is added and the layers are separated. The aqueous phase is washed with 20 ml. of ethyl ether. The combined ether extracts are dried with magnesium sulfate, and the solvent is removed in vacuo in a water bath to give 4.06 g. of an oil, consisting of 3-(2-butynyloxy)-4-amino-1,2,5-thiadiazole.

EXAMPLE 8

3-allyloxy-4-(N⁴-acetylsulfanilamido)-1,2,5-thiadiazole

A solution of 1 g. (6.38 mmole) of 3-allyloxy-4-amino-1,2,5-thiadiazole in 5 ml. of pyridine is chilled to 0° C. with stirring, and to it is added 1.49 g. (6.38 mmole) of N-acetylsulfanilyl chloride. The solid soon dissolves and the solution is allowed to rise to room temperature and stand for 12 hours. 20 ml. of water is added, and 10 ml. is distilled out. The gummy residue is dissolved by the addition of 1 ml. of concentrated ammonium hydroxide. The solution is then treated with activated charcoal and filtered. The filtrate is then acidified to pH 3–5 with glacial acetic acid and stirred in the cold for 1 hour. The precipitate obtained is filtered off, washed with water, and dried in vacuo at 60° C. to give 3-allyloxy-4-(N⁴-acetylsulfanilamido)-1,2,5-thiadiazole, M.P. 184–188° C.

EXAMPLE 9

3-(2-butynyloxy)-4-(N⁴-acetylsulfanilamido)-1,2,5-thiadiazole

A solution of 6.38 mmoles of 3-(2-butynyloxy)-4-amino-1,2,5-thiadiazole in 5 ml. of pyridine is chilled to 0° C. with stirring, and to it is added 1.49 g. (6.38 mmole) of N-acetylsulfanilyl chloride. The solid soon dissolves and the solution is allowed to rise to room temperature and stand for 12 hours. 20 ml. of water is added, and 10 ml. is distilled out. The gummy residue is dissolved by the addition of 1 ml. of concentrated ammonium hydroxide. The solution is then treated with activated charcoal and filtered. The filtrate is then acidified to a pH of 4–5 with glacial acetic acid and stirred in the cold for one hour. The precipitate obtained is filtered off, washed with water, and dried in vacuo at 60° C. to give 3-(2-butynyloxy)-4-(N⁴-acetylsulfanilamido)-1,2,5-thiadiazole.

EXAMPLE 10

3-allyloxy-4-sulfanilamido-1,2,5-thiadiazole

A mixture of 1.7 g. (5.63 mmole) of 3-allyloxy-4-(N⁴-acetylsulfanilamido)-1,2,5-thiadiazole, 15 ml. of water, and 1.18 ml. of 19 N sodium hydroxide (22.5 mmole) is refluxed for one and one-half hours. The solution is treated with 200 mg. of activated charcoal, filtered, and the filtrate adjusted to a pH of 4 with concentrated hydrochloric acid. 3-allyloxy-4-sulfanilamido-1,2,5-thiadiazole precipitates and is recovered by filtration. The solid is washed with water and dried in vacuo at 60° C. to give 3-allyloxy-4-sulfanilamido-1,2,5-thiadiazole, M.P. 152.5–154° C.

EXAMPLE 11

3-(2-butynyloxy)-4-sulfanilamido-1,2,5-thiadiazole

A mixture of 5.63 mmole of 3-(2-butylnyloxy)-4-(N⁴-acetylsulfanilamido)-1,2,5-thiadiazole, 15 ml. of water, and 1.8 ml. of 19 N sodium hydroxide (22.5 mmole) is refluxed for 1½ hours. The solution is treated with 200 mg. of activated charcoal, filtered, and the filtrate adjusted to a pH of 4 with concentrated hydrochloric acid. 3 - (2 - butynyloxy) - 4 - sulfanilamido - 1,2,5-thiadiazole precipitates and is recovered by filtration. The solid is washed wtih water and dried in vacuo at 60° C. to give 3-(2-butynyloxy)-4-sulfanilamido-1,2,5-thiadiazole, M.P. 198–199° C.

EXAMPLE 12

3-hydroxy-4-cyano-1,2,5-thiadiazole, potassium salt 21.3 grams of potassium cyanide is mixed with 200 ml. of dry acetonitrile. The mixture is agitated and gaseous sulfur dioxide is passed into the reaction mixture at a rate of 500 ml./minute for a period of 90 minutes, during which time the temperature is maintained at 60° C. The mixture is then filtered and the filter cake is washed with acetonitrile. The acetonitrile filtrate is concentrated to dryness in vacuo. The residue is recrystallized from a mixture of methanol and ether to give the potassium salt of 3-hydroxy-4-cyano-1,2,5-thiadiazole.

We claim:
1. A compound of the formula 3-OR-4-cyano-1,2,5-thiadiazole wherein R is methallyl, allyl, or 2-butynyl.
2. A compound of the formula

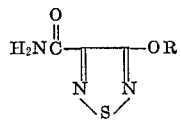

wherein R is loweralkenyl or loweralkynyl.
3. The compound of claim 2 wherein R is methallyl, allyl, or 2-butynyl.
4. A compound of the formula

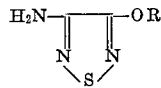

wherein R is loweralkenyl or loweralkynyl.
5. The compound of claim 4 wherein R is methallyl, allyl or 2-butylnyl.

References Cited

UNITED STATES PATENTS

| 2,358,031 | 9/1944 | Roblin et al. | 260—239.6 |
| 3,068,238 | 12/1962 | Ross et al. | 260—302 |
| 3,117,972 | 1/1964 | Ross et al. | 260—302 |
| 3,117,973 | 1/1964 | Ross et al. | 260—302 |

FOREIGN PATENTS

| 1,926/64 | 2/1964 | Japan. |

OTHER REFERENCES

Wallis et al., Org. Reactions, vol. III, ch. 7 (1946), pp. 277–82.

HENRY R. JILES, Primary Examiner

C. M. SHURKO, Assistant Examiner

U.S. Cl. X.R.

260—239.95, 306.8, 999